United States Patent
Kumar et al.

(10) Patent No.: US 10,904,835 B2
(45) Date of Patent: Jan. 26, 2021

(54) INTELLIGENT POWER SAVING DURING ACTIVE VOICE/DATA CALL

(71) Applicant: QUALCOMM Incorporated, San Diego, CA (US)

(72) Inventors: Mukesh Kumar, Hyderabad (IN); Suresh Sanka, Hyderabad (IN); Priyangshu Ghosh, Kolkata (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/157,812

(22) Filed: Oct. 11, 2018

(65) Prior Publication Data
US 2019/0132798 A1 May 2, 2019

Related U.S. Application Data

(60) Provisional application No. 62/579,755, filed on Oct. 31, 2017.

(51) Int. Cl.
*H04W 52/02* (2009.01)
*H04W 76/28* (2018.01)

(52) U.S. Cl.
CPC ..... *H04W 52/0235* (2013.01); *H04W 52/028* (2013.01); *H04W 52/0229* (2013.01); *H04W 76/28* (2018.02)

(58) Field of Classification Search
CPC ........................ H04W 52/0235; H04W 76/28
See application file for complete search history.

(56) References Cited

U.S. PATENT DOCUMENTS

| 9,549,359 | B2 | 1/2017 | Vangala et al. | |
|---|---|---|---|---|
| 9,661,536 | B2 | 5/2017 | Zingler et al. | |
| 9,854,496 | B2 | 12/2017 | Johansson et al. | |
| 2009/0137246 | A1* | 5/2009 | Xing | H04W 36/18 455/434 |
| 2014/0200002 | A1 | 7/2014 | Vangala et al. | |
| 2015/0016331 | A1* | 1/2015 | Kim | H04J 11/005 370/312 |
| 2015/0146595 | A1* | 5/2015 | Jamadagni | H04W 52/0229 370/311 |
| 2015/0341148 | A1* | 11/2015 | Kazmi | H04L 5/0098 370/252 |
| 2016/0119876 | A1 | 4/2016 | Gopal et al. | |

(Continued)

OTHER PUBLICATIONS

International Search Report and Written Opinion—PCT/US2018/055688—ISA/EPO—Jan. 4, 2019.

*Primary Examiner* — Samina F Choudhry
(74) *Attorney, Agent, or Firm* — Patterson & Sheridan, L.L.P.

(57) ABSTRACT

Certain aspects of the present disclosure relate to methods and apparatus for saving power while performing radio access technology measurements. An exemplary method that may be performed by user equipment (UE) includes obtaining a configuration indicating a measurement gap for the UE to measure one or more non-serving cells, wherein the UE does not receive data transmissions from a serving cell during the measurement gap, deciding not to measure the non-serving cells during a period including at least a portion of the measurement gap, and deactivating a receive chain of the UE during the period.

24 Claims, 13 Drawing Sheets

(56) References Cited

U.S. PATENT DOCUMENTS

2016/0150435 A1\* 5/2016 Baek .................. H04W 16/28
                                                         370/252
2016/0295439 A1   10/2016 Yang et al.
2017/0359160 A1   12/2017 Ji et al.

\* cited by examiner

INTELLIGENT POWER SAVING DURING ACTIVE VOICE/DATA CALL

CROSS-REFERENCE TO RELATED APPLICATIONS

The present Application for Patent claims benefit of and priority to U.S. Provisional Patent Application No. 62/579,755, filed Oct. 31, 2017, which is assigned to the assignee hereof and hereby expressly incorporated by reference herein in its entirety as if fully set forth below and for all applicable purposes.

BACKGROUND

Field of the Disclosure

The present disclosure relates generally to wireless communication, and more particularly, to methods and apparatus for saving power while performing radio access technology measurements.

Description of the Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, wideband code division multiple access (WCDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

When a wireless device detects that channel conditions on a currently active connection are degrading, but the wireless device is unable to find any intra-frequency neighbors to handover the call too, it is desirable for the wireless device to search inter-frequency cells and cells using different radio access technologies (RATs). In devices with a single receive chain, this is commonly accomplished via connected mode measurement (CM) gaps. For example, an LTE network may open CM gaps with a specified pattern for one or more of the following purposes:
1. Measuring WCDMA inter frequency cells (LTE to WCDMA, or L2W)
2. Measuring LTE cells (L2L)
3. Measuring GSM cells (L2G).

Measuring other frequencies by a UE causes the UE to consume power (e.g., for a receive chain and to perform calculations). Therefore, techniques that improve power consumption by a UE measuring frequencies are desirable. Preferably, these improvements should be applicable to any multi-access technologies and the telecommunication standards that employ these technologies.

SUMMARY

Certain aspects of the present disclosure provide a method for wireless communications by a user equipment (UE). The method generally includes obtaining a configuration indicating a measurement gap for the UE to measure one or more non-serving cells, wherein the UE does not receive data transmissions from a serving cell during the measurement gap, deciding not to measure the non-serving cells during a period including at least a portion of the measurement gap, and deactivating a receive chain of the UE during the period.

Certain aspects of the present disclosure provide an apparatus for wireless communications. The apparatus generally includes a processor configured to obtain a configuration indicating a measurement gap for the apparatus to measure one or more non-serving cells, wherein the apparatus does not receive data transmissions from a serving cell during the measurement gap, to decide not to measure the non-serving cells during a period including at least a portion of the measurement gap, to deactivate a receive chain of the apparatus during the period, and a memory coupled with the processor.

Certain aspects of the present disclosure provide an apparatus for wireless communication. The apparatus generally includes means for obtaining a configuration indicating a measurement gap for the apparatus to measure one or more non-serving cells, wherein the apparatus does not receive data transmissions from a serving cell during the measurement gap, means for deciding not to measure the non-serving cells during a period including at least a portion of the measurement gap, and means for deactivating a receive chain of the apparatus during the period.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), and/or LTE in an unlicensed spectrum (LTE-whitespace).

DETAILED DESCRIPTION

Figure 1:
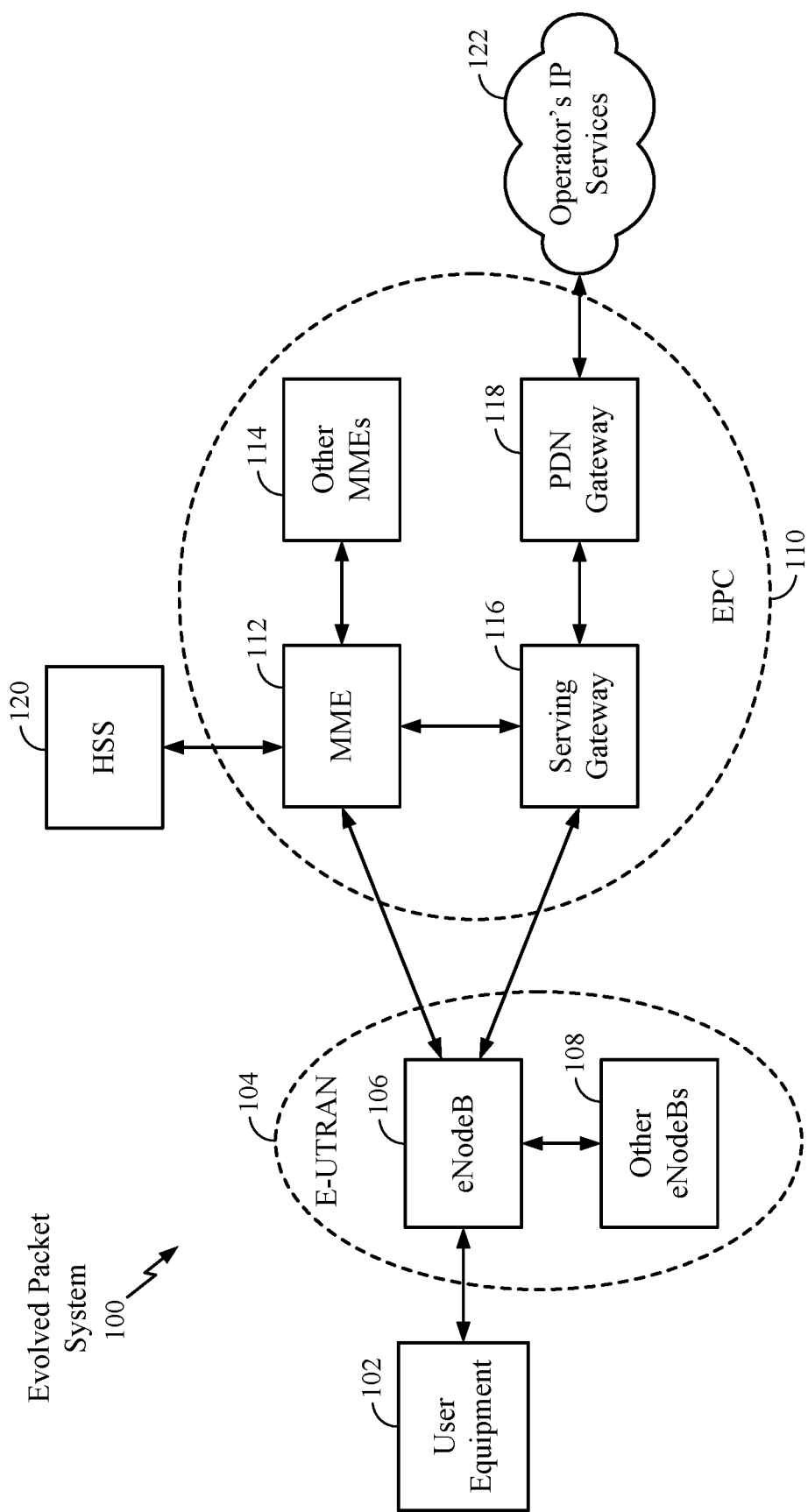
FIG. 1 is a diagram illustrating an example of a network architecture.

When a wireless device detects that channel conditions on a currently active connection are degrading, but the wireless device is unable to find any intra-frequency neighbors to which to handover the call, the wireless device needs to explore inter-frequency and inter-RAT cells. In wireless devices having a single receive chain, this is commonly accomplished via connected mode measurement (CM) gaps. For example, an LTE network may open CM gaps with a specified pattern for one or more of the following purposes:
 1. Measuring wideband code division multiple access (WCDMA) inter frequency cells (LTE to WCDMA, or L2W)
 2. Measuring LTE cells (L2L)
 3. Measuring GSM cells (L2G)

Connected mode measurements (CM) is a technique that may be employed in UMTS, LTE, and $5^{th}$ Generation (5G) networks to allow single-receive-chain UEs (i.e., UEs that have fewer than two receive chains) in connected mode to search for inter-frequency cells and cells using other radio access technologies (RATs), i.e., inter-RAT cells. In poor serving frequency conditions, the home network (N/w) may direct the UE to enter compressed mode, during which a series of synchronized CM gaps (e.g., transmission (Tx) gaps at the network and reception (Rx) gaps at the UE) are scheduled for the UE by the network to allow the UE to tune away from the serving frequency during the gaps and search for and perform measurements on neighboring cells.

According to aspects of the present disclosure, techniques for power saving by a UE while in compressed mode are described. A UE may, for example, achieve more than 2% power savings at battery during a voice call by using the disclosed techniques.

For ease of explanation, disclosed techniques are described in terms of an LTE network and devices, however, the disclosure is not so limited, and the disclosed techniques are also applicable to other wireless technologies, such as third generation (3G) and fifth generation (5G) technologies.

Generally, a UE performing a voice call over LTE (e.g., Voice over LTE, VoLTE) experiencing weak LTE coverage, but having reasonable GSM coverage, may handover the voice call to a suitable Global System for Mobile Communications (GSM) cell. However, the UE must first find a suitable GSM cell to handover to. To find a suitable GSM cell, the UE generally must perform measurements in one or more available GSM cells and report the results of the measurements to a serving cell.

A base station of a cell serving a UE operating according to LTE specifications may allocate resources (e.g., time resources) to a UE in connected mode for the UE to use in performing GSM measurements (e.g., L2G measurements). Generally the GSM measurements in a GSM cell include measuring received signal strength indicator (RSSI) in the cell and detecting and decoding a Frequency Correction Channel (FCCH), a Synchronization Channel (SCH), and Base Station Identification Code (BSIC).

If the LTE signal degrades, a GSM cell must be found quickly to maintain the voice call. If the network does not get an opportunity to switch the voice call to a GSM cell before the LTE call quality drops below a threshold, the voice call may be dropped. The serving cell may schedule 6 ms measurement gaps 40 ms or 80 ms apart (e.g., with a 40 ms or 80 ms periodicity). It is desirable for the GSM FCCH and SCH frames to align with a scheduled measurement gap (e.g., a measurement gap scheduled by the LTE serving cell) for the UE to be able to detect and decode the FCCH and SCH frames. With the periodicity of the measurement gaps, the likelihood of a GSM frame aligning with a measurement gap is about 1 GSM frame aligning with a measurement gap every second. Further, once the UE has decoded an FCCH, the UE must wait for the SCH to align with a measurement gap for the UE to decode an SCH. In addition, the LTE measurement gaps may be shared between multiple RATs and frequencies. That is, the UE may be measuring more than one GSM cell and other RATs during the various LTE measurement gaps. Also, gap usage scales up with the number of RATs and frequencies to be measured. So the likelihood of a GSM frame aligning with a 6 ms gap (e.g., an LTE measurement gap) is even smaller than the previously mentioned once per second. Once FCCH and SCH have been decoded, and the GSM signal is good for a period of time (e.g., dictated by a time-to-trigger (TTT) timer), the measured GSM cell is reported by the UE to the serving LTE cell, and the call may be switched from the LTE cell to the GSM cell.

Thus, L2G connected mode measurements may take a long time (e.g., per 3GPP specification requirements), and the delayed L2G measurements may result in a VoLTE call drop, as a suitable GSM cell may not be found in time for the handover before LTE call quality drops below a threshold.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof.

Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

In an aspect, a UE (e.g., UE 102) determines, while in a connected state Discontinuous Reception (CDRX) mode in a first cell of a first Radio Access Technology Network (RAT), that a second cell of a second RAT is to be measured. The UE schedules at least two operational periods related to transitioning between ON and OFF states of the CDRX mode to overlap, to increase a period available for measuring signals in the second cell. In an alternative aspect, the UE determines that a voice call is active in the first cell and that one or more conditions relating to reporting of measurements of the second cell are met, and initiates an unscheduled measurement period for measuring a signal in the second cell, in response to the determination. In a another alternative aspect, the UE selects, while in a CDRX mode in a first cell of a first RAT, a second cell from a plurality of cells of a second RAT for decoding at least one channel transmitted in the second cell, and assigns a set of contiguous measurement gaps for decoding the at least one channel in the second cell, to allow for measurement reporting of the second cell.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
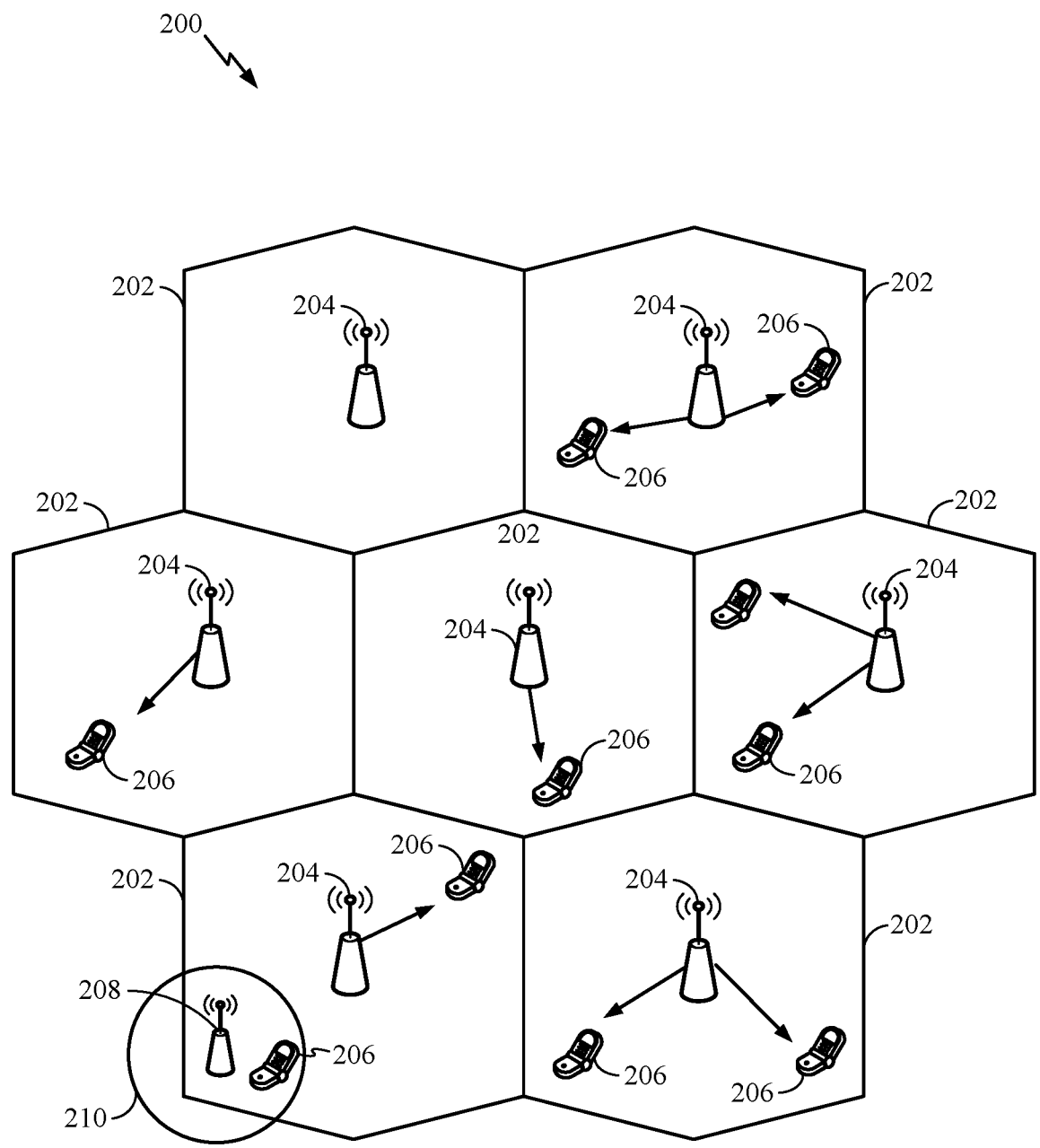
FIG. 2 is a diagram illustrating an example of an access network.

FIG. 2 is a diagram illustrating an example of an access network 200 in an LTE network architecture in which aspects of the present disclosure may be practiced. For example, UEs 206 may be configured to implement techniques for improving inter-RAT measurements described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
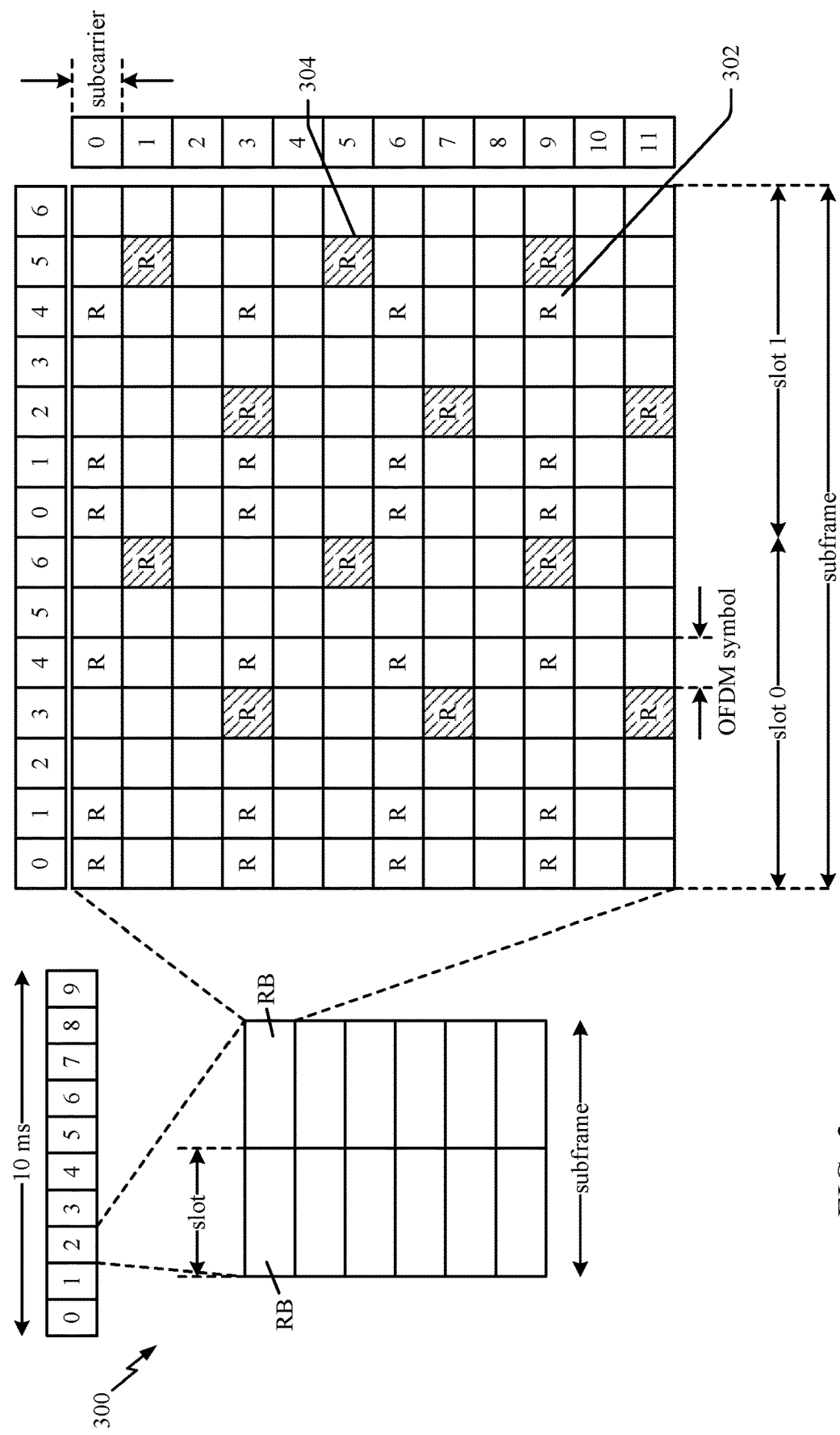
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
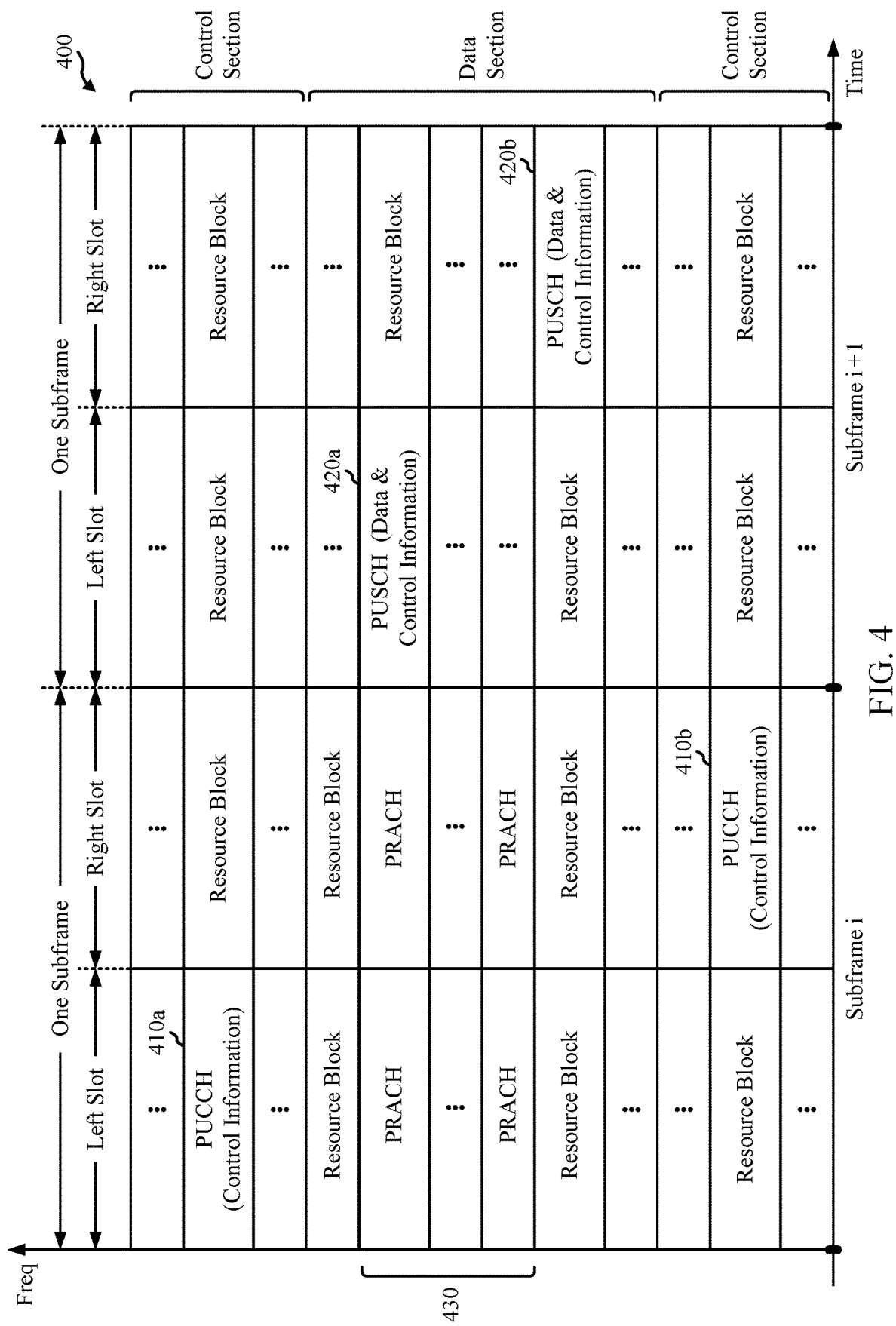
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
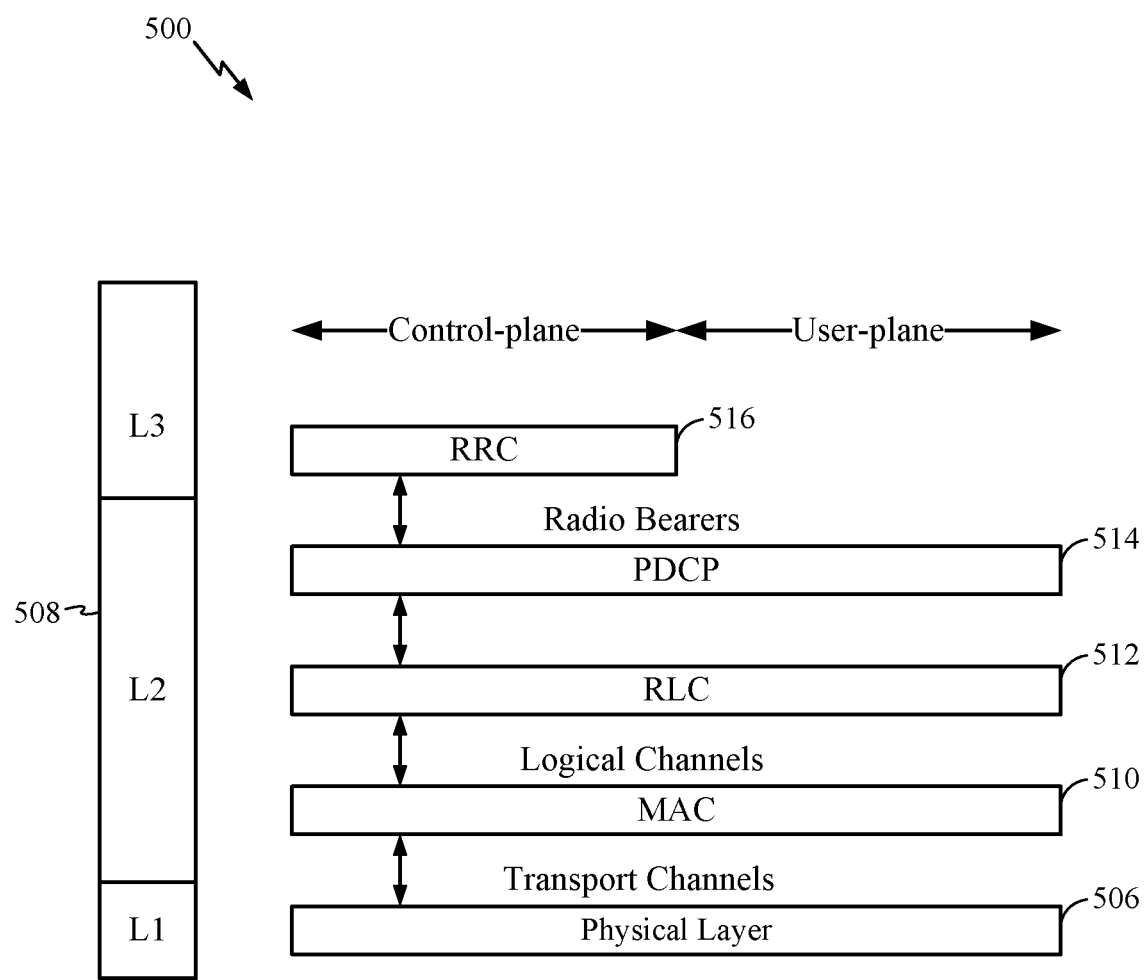
FIG. 5 is a diagram illustrating an example of a radio protocol architecture for the user plane and control plane.

FIG. 5 is a diagram 500 illustrating an example of a radio protocol architecture for the user plane and control plane in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
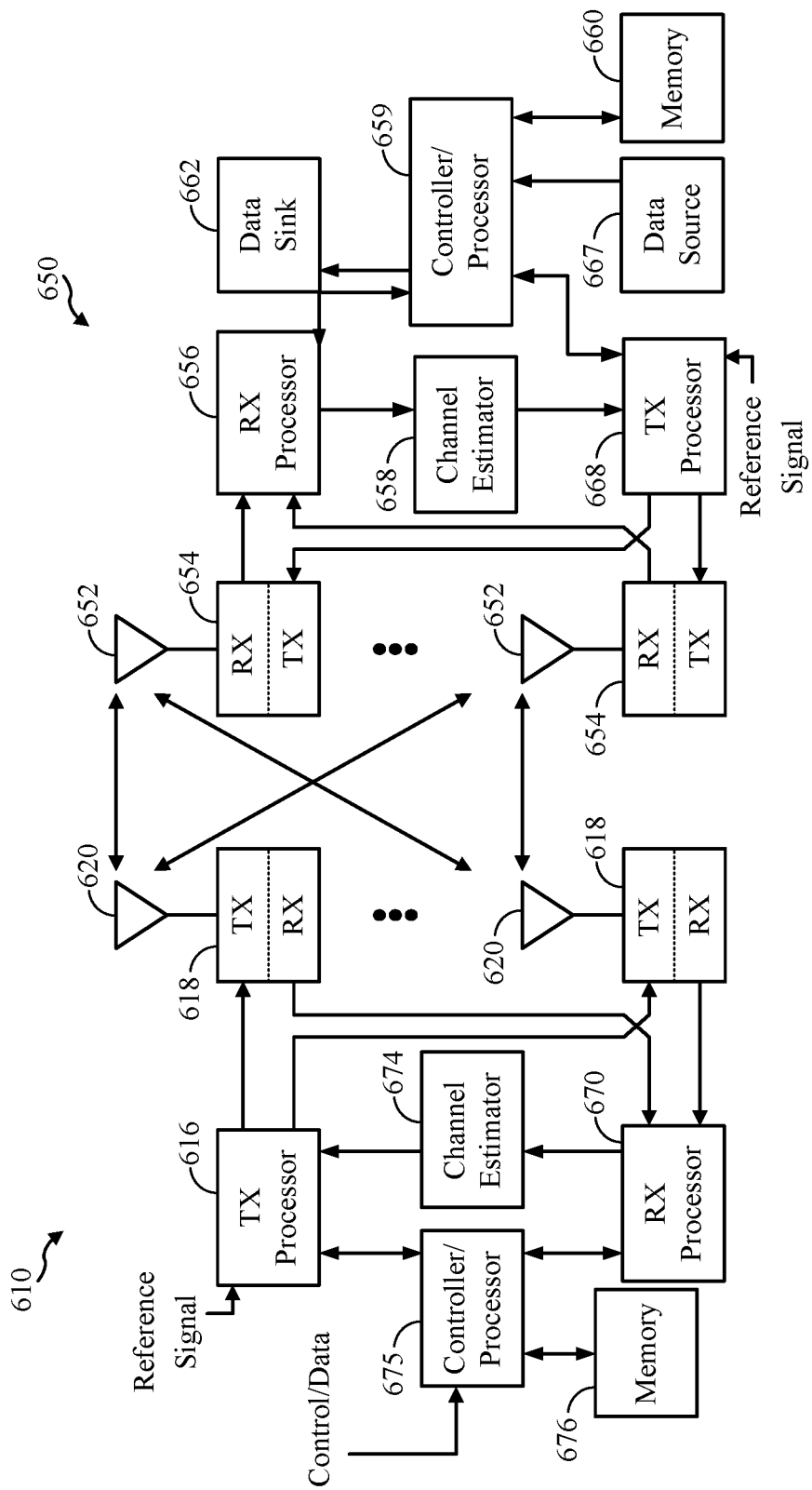
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In an aspect, a UE (e.g., UE 650) determines, while in a connected state Discontinuous Reception (CDRX) mode in a first cell of a first Radio Access Technology Network (RAT), that a second cell of a second RAT is to be measured. The UE schedules at least two operational periods related to transitioning between ON and OFF states of the CDRX mode to overlap, to increase a period available for measuring signals in the second cell. In an alternative aspect, the UE determines that a voice call is active in the first cell and that one or more conditions relating to reporting of measurements of the second cell are met, and initiates an unscheduled measurement period for measuring a signal in the second cell, in response to the determination. In a another alternative aspect, the UE selects, while in a CDRX mode in a first cell of a first RAT, a second cell from a plurality of cells of a second RAT for decoding at least one channel transmitted in the second cell, and assigns a set of contiguous measurement gaps for decoding the at least one channel in the second cell, to allow for measurement reporting of the second cell.

It may be noted that the UE noted above for implementing the improving inter-Radio Access Technology (RAT) measurements in accordance with certain aspects of the present disclosure may be implemented by a combination of one or more of the controller 659, the RX processor 656 and/or receiver 654 at the UE 650, for example.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
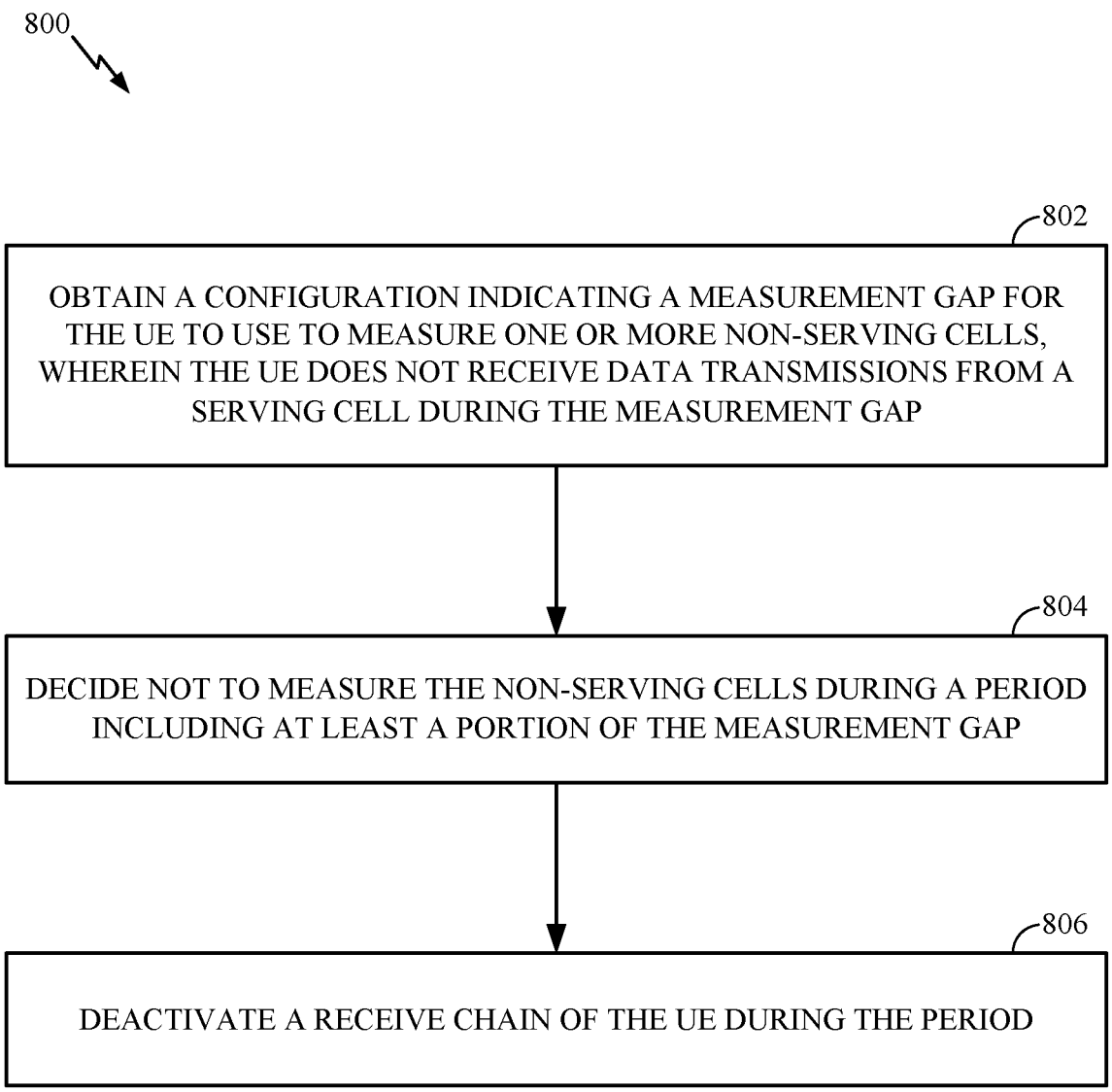
FIG. 8 illustrates example operations, performed by a UE, to enhance GSM measurements during CDRX OFF periods, in accordance with certain aspects of the present disclosure.
Figure 12:
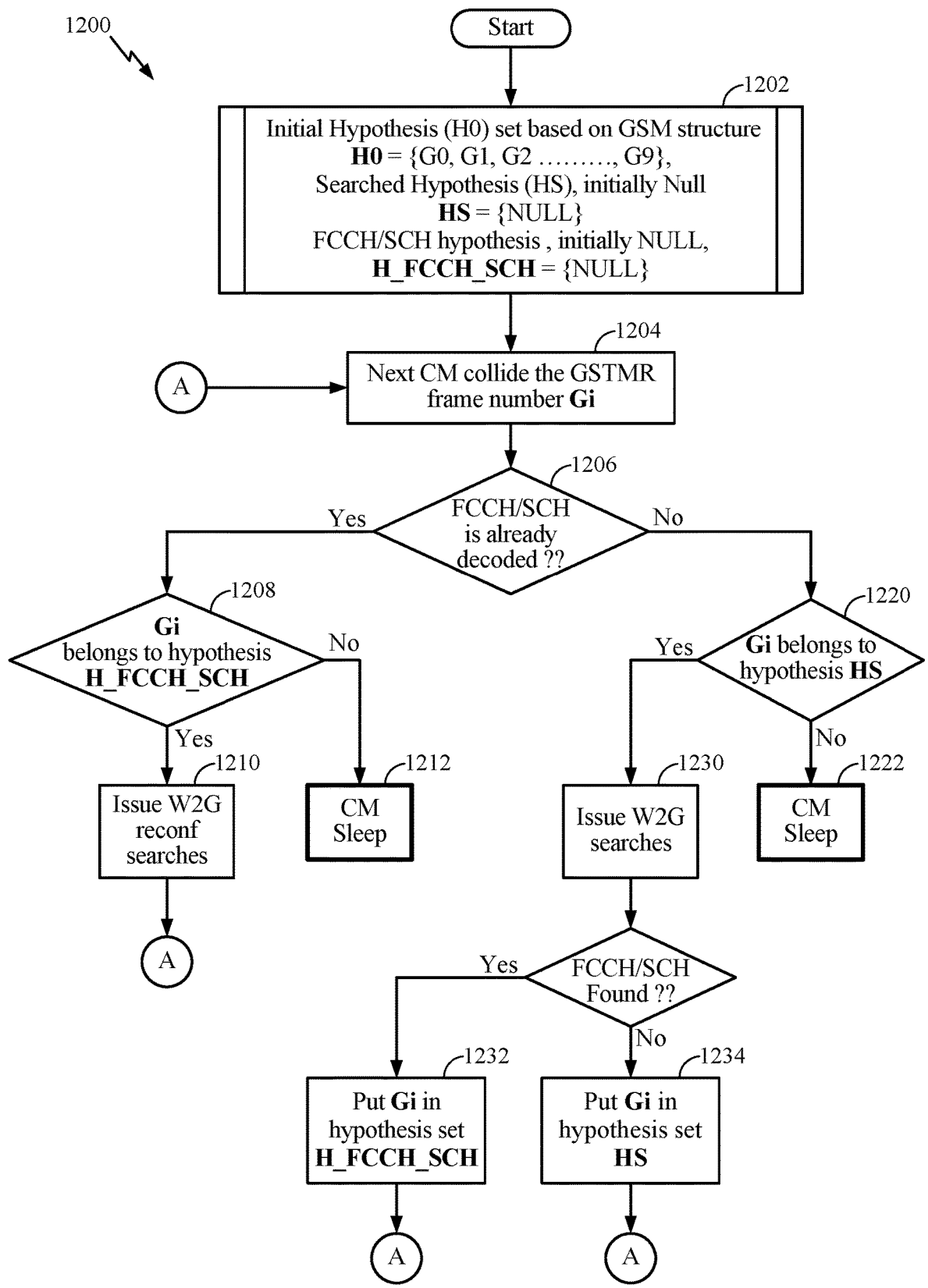
FIG. 12 illustrates an exemplary algorithm 1200 that a UE may perform, in accordance with certain aspects of the present disclosure.

The controller/processor 659 and/or other processors, components and/or modules at the UE 650 may perform or direct operations, for example, operations 800 in FIG. 8, the algorithm 1200 in FIG. 12, and/or other processes for the techniques described herein for improving inter-RAT measurements. In certain aspects, one or more of any of the components shown in FIG. 6 may be employed to perform example operations 800, the algorithm 1200, and/or other processes for the techniques described herein. The memories 660 and 676 may store data and program codes for the UE 650 and eNB 610 respectively, accessible and executable by one or more other components of the UE 650 and the eNB 610.

Example Power Saving During Cell Measurements

When a wireless device detects that channel conditions on a currently active connection are degrading, but the wireless device is unable to find any intra-frequency neighbors to handover the call too, the wireless device needs to explore inter-frequency and inter-RAT cells. In devices with a single receive chain, exploration of inter-frequency and inter-RAT cells is commonly accomplished via connected mode measurement (CM) gaps. For example, an LTE network may open CM gaps with a specified pattern for one or more of the following purposes:

1. Measuring WCDMA inter frequency cells (LTE to WCDMA, or L2W)
2. Measuring LTE cells (L2L)
3. Measuring GSM cells (L2G).

The above gaps may be collectively referred to as L2X measurement gaps.

Connected mode measurements (CM) is a technique that may be employed in UMTS, LTE, and 5G networks to allow single-receive-chain UEs (i.e., UEs that have fewer than two receive chains) in connected mode to search for inter-frequency cells and cells using other radio access technologies (RATs), i.e., inter-RAT cells. In poor serving frequency conditions, the home network (N/w) may direct the UE to enter compressed mode during which a series of synchronized CM gaps (e.g., transmission (Tx) gaps at the network and reception (Rx) gaps at the UE) are scheduled for the UE by the network to allow the UE to tune away from the serving frequency during the CM gaps (also referred to herein as measurement gaps) and search for and perform measurements on neighboring cells.

Generally, a UE performing a voice call over LTE (e.g., Voice over LTE, VoLTE) experiencing weak LTE coverage, but having reasonable GSM coverage, may handover the voice call to a suitable Global System for Mobile Communications (GSM) cell. However, the UE must first find a suitable GSM cell to handover to. To find a suitable GSM cell, the UE generally must perform measurements in one or more available GSM cells and report the results of the measurements to a serving cell.

A base station of a cell serving a UE operating according to LTE specifications may allocate resources (e.g., time resources) to a UE in a connected mode for the UE to use in performing GSM measurements (e.g., L2G measurements). The allocated resources may be referred to as CM gaps or measurement gaps. Generally, the GSM measurements in a GSM cell include measuring received signal strength indicator (RSSI) in the cell and detecting and decoding a Frequency Correction Channel (FCCH), a Synchronization Channel (SCH), and Base Station Identification Code (BSIC).

If the LTE signal degrades, a GSM cell must be found quickly for the UE to maintain the voice call. If the network does not get an opportunity to switch the voice call to a GSM cell before the LTE call quality drops below a threshold, the voice call may be dropped. The serving cell may schedule 6 ms measurement gaps 40 ms or 80 ms apart (e.g., with a 40 ms or 80 ms periodicity). It is desirable for the GSM FCCH and SCH frames to align with a scheduled measurement gap for the UE to be able to detect and decode the FCCH and SCH frames. With the periodicity of the measurement gaps, the likelihood of a GSM frame aligning with a measurement gap is about 1 per second. Further, once the FCCH is decoded, the UE must wait for the SCH to align with a measurement gap for the UE to decode the SCH. In addition, the UE may share the LTE gaps for measurements of multiple RATs and/or multiple frequencies. Also, measurement gap usage scales up with number of RATs and frequencies. So the likelihood of a GSM frame aligning with a 6 ms measurement gap may be even lower than the previously mentioned once per second. Once FCCH and SCH have been decoded, and the GSM signal is good for a period of time (e.g., dictated by a TTT timer), the measured GSM cell is reported (i.e., by the UE to the UE's LTE serving cell), and the call may be switched (e.g., in response to commands from the network) from the LTE cell to the GSM cell.

Figure 7:
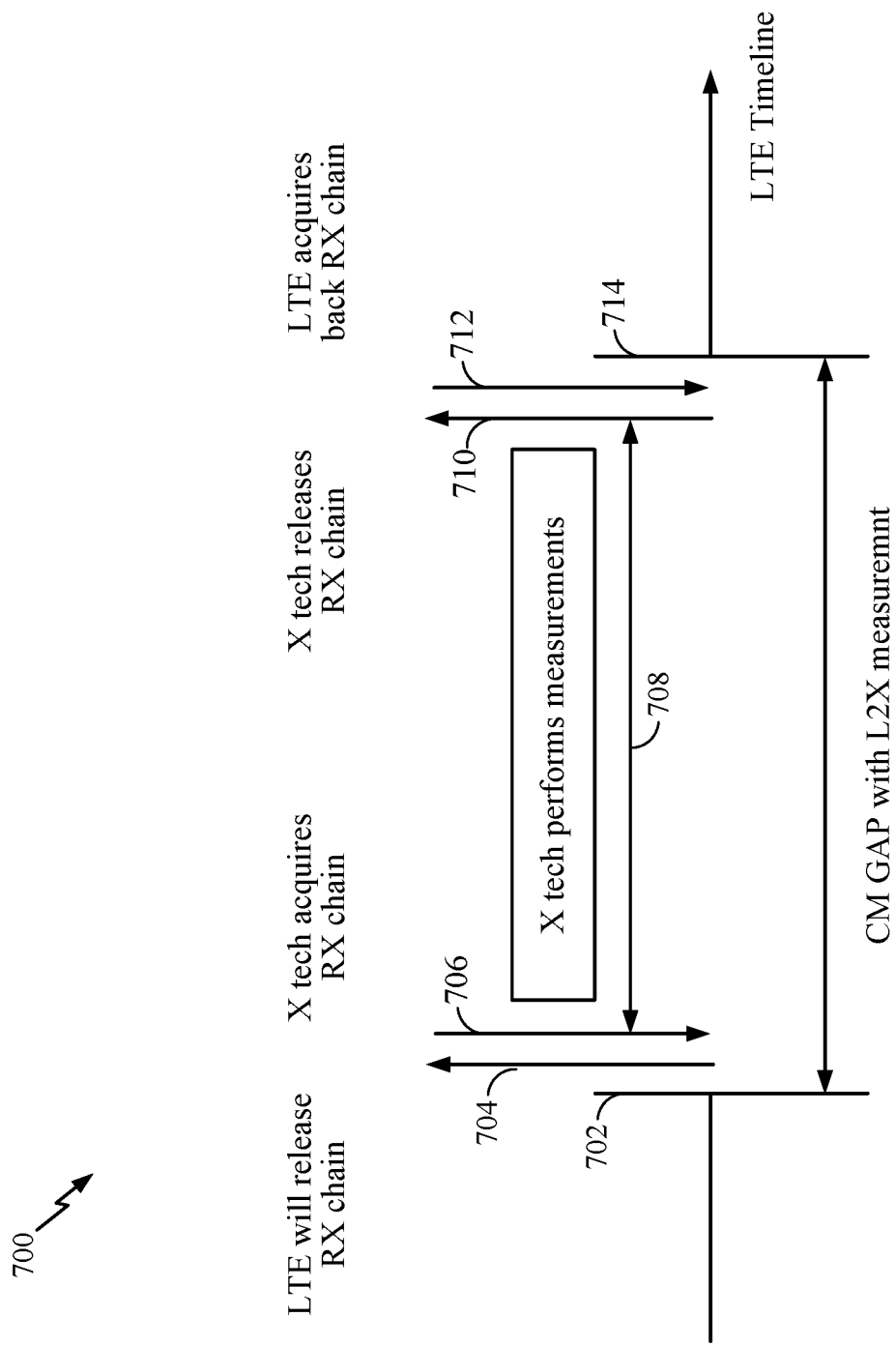
FIG. 7 illustrates operations of a UE during an example L2X measurement gap, in accordance with previously known techniques.

FIG. 7 illustrates operations of a UE during an example L2X measurement gap 700 (e.g., a connected mode measurement gap), in accordance with previously known techniques. As shown in FIG. 7, an L2X measurement gap begins at 702. The LTE protocol stack of the UE releases control of the receive chain of the UE (e.g., UE 102 shown in FIG. 1) at 704. At 706, a protocol stack of the non-LTE technology X (tech X, e.g., GSM or WCDMA) acquires control of the receive chain of the UE. The tech X protocol stack measures signals of tech X cells during the period 708. The tech X protocol stack releases control of the receive chain at 710. The LTE protocol stack regains control of the receive chain at 712. At 714, the L2X measurement gap ends. While the figure is described as a single protocol stack measuring signals of a single technology, the UE may instead perform measurements on more than one technology and on more than one cell during the connected mode measurement gap. It may be noted that the RX chain is ON (e.g., with multiple components consuming power) during the CM gap 708 for the target technology (tech X) or technologies.

According to aspects of the present disclosure, a UE may use connected mode gaps more effectively, identify useful (e.g., aligning with one or more frames to be measured) versus useless (e.g., failing to align with one or more frames the UE needs to measure) measurement gaps, and save power during cell measurements by turning off or reducing usage of a receive chain and other hardware during useless measurement gaps and useless portions of useful measurement gaps. As described herein, a UE may be referred to as "sleeping" during these useless portions and useless gaps, instead of the UE configuring the receive chain to operate according to the target technology and thus consuming power. In current techniques, a UE does not shut down the receive chain during a CM gap, even though part or all of the CM gap is useless, i.e., not used for measurements.

In aspects of the present disclosure, a UE may use connected mode measurement gaps more effectively, identify useful versus useless measurement gaps, and save power during cell measurements without requiring any changes to a network configuration or network operation, as the network is already configured to schedule measurement gaps for a UE and does not schedule the UE to receive or transmit signals during the measurement gaps.

FIG. 8 illustrates example operations 800 performed by a UE (e.g., UE 102, shown in FIG. 1, or UE 650, shown in FIG. 6) to save power during cell measurements, in accordance with certain aspects of the present disclosure. The UE may perform operations 800 using one or more components shown in FIG. 6.

Operations 800 begin, at block 802, by the UE obtaining a configuration indicating a measurement gap for the UE to use to measure one or more non-serving cells, wherein the UE does not receive data transmissions from a serving cell during the measurement gap. For example, UE 102, shown in FIG. 1, obtains (e.g., receives) a configuration (e.g., from eNodeB 106) indicating a measurement gap (e.g., of six milliseconds) for the UE to use to measure one or more non-serving cells, wherein the UE does not receive data transmissions (e.g., VoLTE transmissions) from a serving cell (e.g., served by eNodeB 106) during the measurement gap.

Operations 800 continue at block 804 with the UE deciding not to measure the non-serving cells during a period including at least a portion of the measurement gap. Continuing the example from above, UE 102 decides not to measure the non-serving cells during a period (e.g., the final three milliseconds of the six millisecond gap) including at least a portion of the measurement gap from block 802.

At block 806, operations 800 continue with the UE deactivating a receive chain of the UE during the period. Continuing the example from above, UE 102 deactivates (e.g., powers down components of) a receive chain of the UE during the period from block 804 (e.g., the final three milliseconds of the six millisecond gap).

According to aspects of the present disclosure, the serving cell (i.e., in block 802 of FIG. 8) of the UE may be a 5G cell, an LTE cell, or a wideband code division multiple access (WCDMA) cell.

Figure 9:
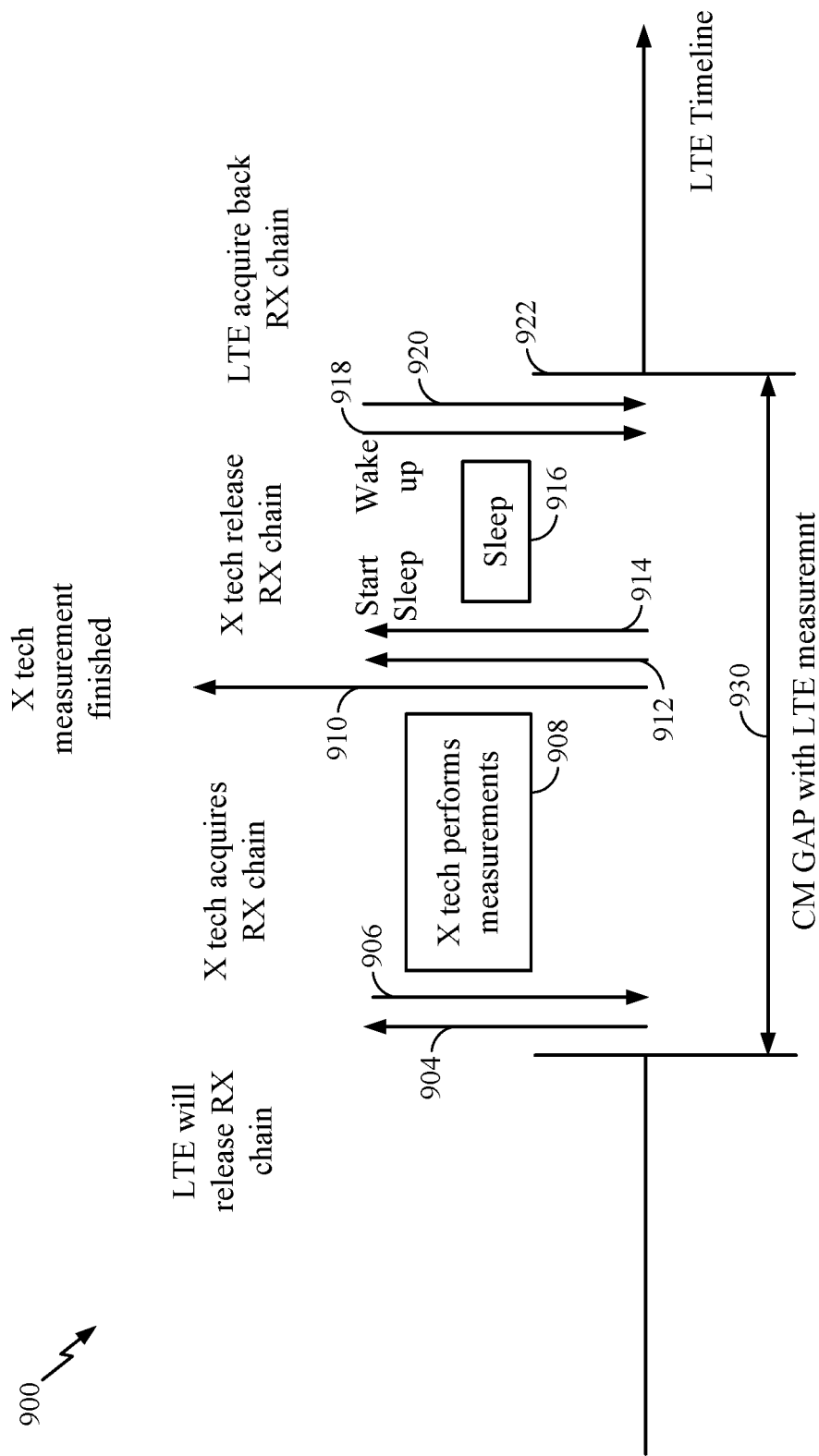
FIG. 9 shows an exemplary timeline that illustrates UE operations during an example L2X connected mode measurement gap, in accordance with aspects of the present disclosure.

FIG. 9 shows an exemplary timeline 900 that illustrates UE operations during an example L2X connected mode measurement gap 930, in accordance with aspects of the present disclosure. As shown in FIG. 9, an L2X measurement gap begins at 902. The LTE protocol stack of the UE releases control of the receive chain of the UE (e.g., UE 102 shown in FIG. 1) at 904. At 906, a protocol stack of a non-LTE technology X (tech X, e.g., GSM or WCDMA) acquires control of the receive chain of the UE. The tech X protocol stack measures signals of tech X cells during the period 908. The tech X protocol stack completes measurements at 910. The tech X protocol stack releases control of the receive chain at 912. At 914, the UE deactivates (e.g., powers down) the receive chain or components of the receive chain. During the period 916, the receive chain of the UE is in a sleep mode, and the UE avoids using power for the receive chain. The UE reactivates the receive chain or the components of the receive chain at 918. The LTE protocol stack regains control of the receive chain at 920. At 922, the L2X measurement gap ends. The UE may perform measurements on more than one technology and on more than one cell during the connected mode measurement gap.

According to aspects of the present disclosure, a UE may be configured with a measurement gap and may determine that the UE should not make any measurements during the gap (e.g., the UE already has sufficient measurements of neighboring cells or the UE has determined that a channel to be measured will not be transmitted during the gap). This may be referred to as a useless gap.

Figure 10:
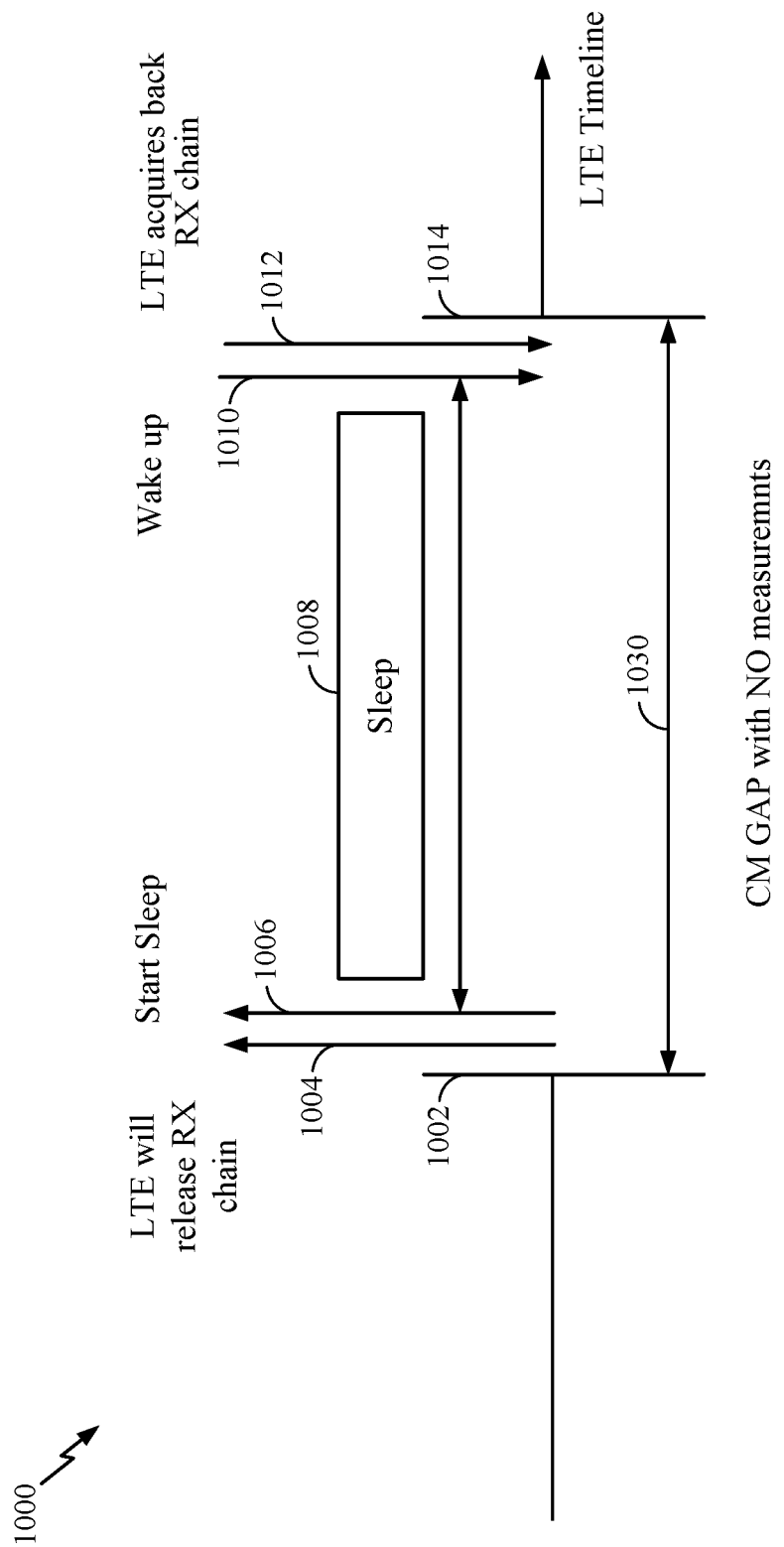
FIG. 10 shows an exemplary timeline that illustrates UE operations during an example L2X connected mode measurement gap that the UE has determined is a useless gap, in accordance with certain aspects of the present disclosure.

FIG. 10 shows an exemplary timeline 1000 that illustrates UE operations during an example L2X connected mode measurement gap 1030 that the UE has determined is a useless gap, in accordance with aspects of the present disclosure. As shown in FIG. 10, an L2X measurement gap begins at 1002. The LTE protocol stack of the UE releases control of the receive chain of the UE (e.g., UE 102 shown in FIG. 1) at 1004. At 1006, the UE deactivates (e.g., powers down) the receive chain or components of the receive chain. During the period 1008, the receive chain of the UE is in a sleep mode, and the UE avoids using power for the receive chain. The UE reactivates the receive chain or the components of the receive chain at 1010. The LTE protocol stack regains control of the receive chain at 1012. At 1014, the L2X connected mode measurement gap ends.

A UE determining that a measurement gap is useless, as described above, is different from other previously known power saving techniques that may be implemented in a connected mode data call, such as CDRX, CPC, and/or EDRX. The previously known power saving techniques are network driven and controlled, whereas the techniques in the present disclosure are fully UE controlled, with no impact on the network.

According to aspects of the present disclosure, a UE may perform an algorithm to identify opportunities to save power during measurement gaps, as described above. For example, a CM measurement gap may be configured by a network on one RAT, and a UE tries to measure a signal of another RAT, which is not synchronized with the first RAT. Often, a CM measurement gap is wasted because the other (e.g., non-serving) technology is not broadcasting when the CM measurement gap is occurring. With the number of implemented technologies increasing, the wastage is increasing. Some field logs show that 70% of CM gaps are not useful.

Figure 11:
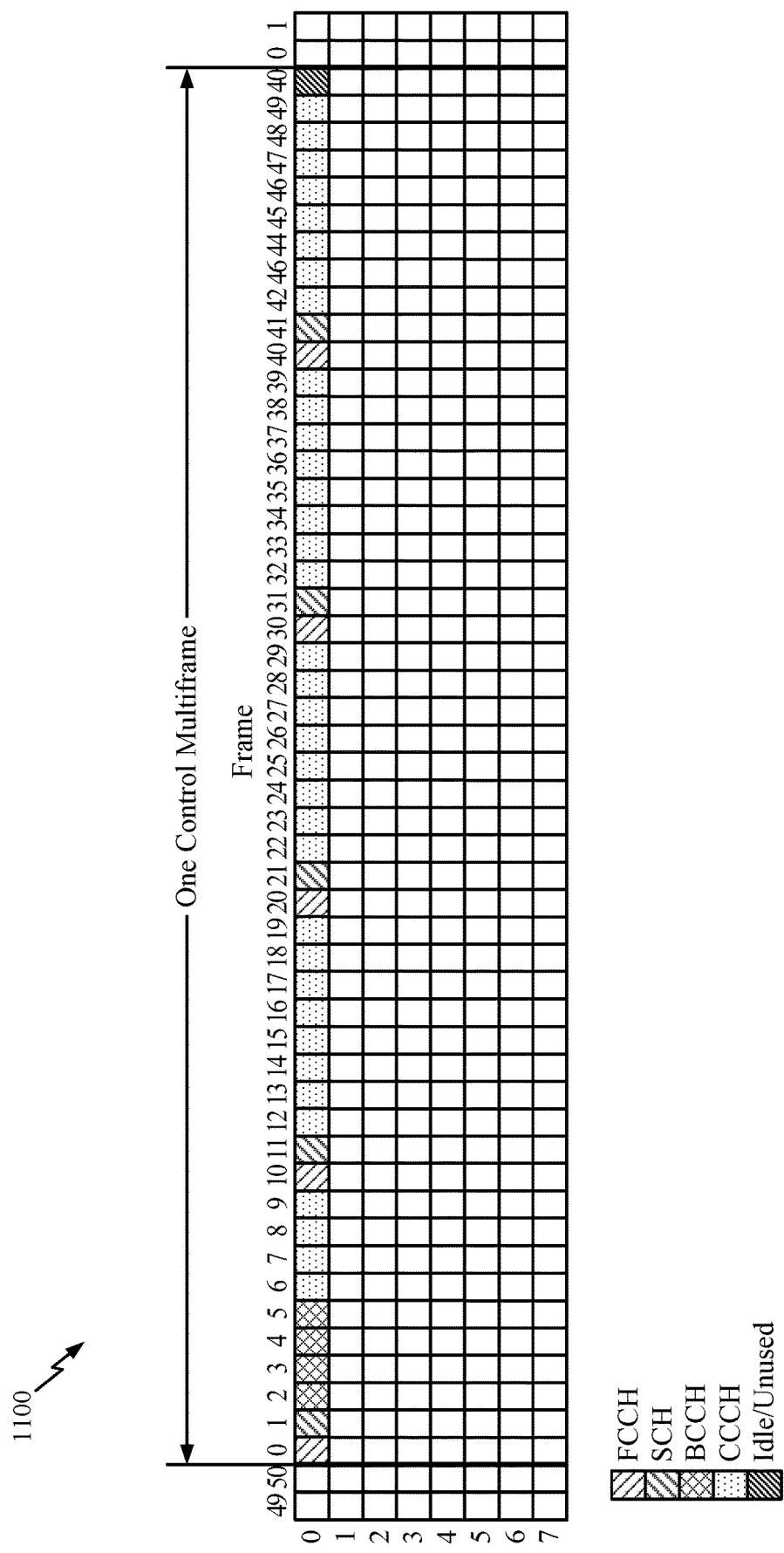
FIG. 11 illustrates an exemplary GSM control multiframe, in accordance with certain aspects of the present disclosure.

FIG. 11 illustrates an exemplary GSM control multiframe 1100. In the exemplary multiframe, a frequency correction channel (FCCH) transmitted on a repeating basis after every 10 GSM frames, i.e., the 0th slot of every frame number 0, 10, 20, 30, 40, 50 will have the FCCH tone, which can be measured by a UE. This multiframe GSM structure can be considered as a multiple of 10 GSM frame for FCCH detection (i.e., detection of an FCCH signal). This is shown in the table below

| FCCH | SCH | BCCH | BCCH | BCCH | BCCH | CCCH | CCCH | CCCH | CCCH |
|---|---|---|---|---|---|---|---|---|---|
| 0 | 1 | 2 | 3 | 4 | 5 | 6 | 7 | 8 | 9 |
| 10 | | | | | | | | | |
| 20 | | | | | | | | | |
| 30 | | | | | | | | | |
| 40 | | | | | | | | | |

From the table, it is clear that if the CM gap collides with (i.e., coincides with) the 0th frame of every set of ten frames, then there is a possibility of finding the FCCH tone during the CM gap. Otherwise there is zero possibility of finding the FCCH tone for the GSM cell.

FIG. 12 illustrates an exemplary algorithm 1200 that a UE (e.g., UE 102 shown in FIG. 1) may use in determining whether to search for a FCCH and/or synchronization channel (SCH) during a GSM frame or to save power by having the receive chain in sleep mode. At block 1202, the UE begins the algorithm by initializing a hypothesis set, H0, based on a GSM structure, such that H0={G0, G1, G2, . . . , G9}. The UE also initializes a searched hypothesis set, HS, with no members, and a FCCH/SCH hypothesis set, H_FCCH_SCH, with no members, i.e., HS and H_FCCH_SCH are both initialized as null sets. At block 1204, a CM measurement gap coincides with a GSM frame having frame number modulo 10 of Gi (i.e., (frame number) mod 10=Gi) from a GSM cell. The UE determines if the UE has previously decoded an FCCH or SCH for that GSM cell at 1206. If the UE has previously decoded an FCCH or SCH for that cell, then the UE proceeds to 1208; if the UE has not previously decoded an FCCH or SCH for that cell, then the UE proceeds to 1220. At 1208, the UE determines if Gi is in the H_FCCH_SCH set (i.e., the UE has previously decoded an FCCH or an SCH in a frame of that cell having a same modulo 10). If Gi is in the H_FCCH_SCH set, then the UE proceeds to 1210, where the UE causes the receive chain to search for a signal (e.g., an FCCH or SCH) from the cell to decode. From 1210, the UE proceeds back to block 1204. If Gi is not in the H_FCCH_SCH set at 1208, the UE proceeds to 1212, where the UE causes the receive chain to be in sleep mode, conserving power. At 1220, the UE determines if Gi is in the HS set. If Gi is in the HS set, then the UE proceeds to 1222, where the UE causes the receive chain to be in sleep mode, conserving power. If Gi is not in the HS set, the UE proceeds to 1230, where the UE causes the receive chain to search for a signal (e.g., an FCCH or SCH) from the cell to decode. If the UE finds a signal to decode, then the UE proceeds to 1232, where the UE adds Gi to the H_FCCH_SCH set and then proceeds back to 1204. If the UE does not find a signal to decode at 1230, then the UE proceeds to 1234, where the UE adds Gi to the HS set and proceeds back to 1204.

Figure 13:
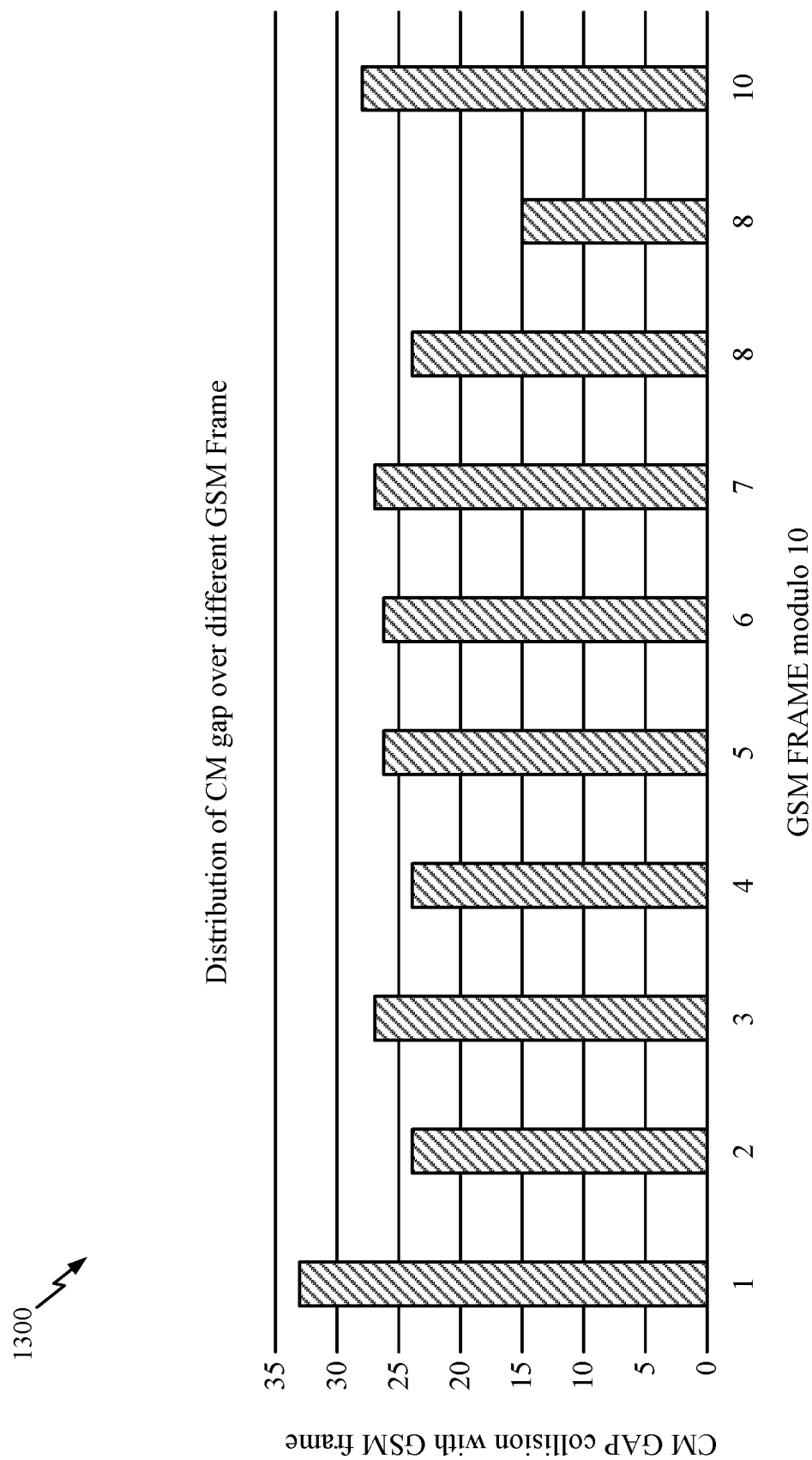
FIG. 13 shows a graph of a typical distribution of CM measurement gaps coinciding with GSM frames, in accordance with certain aspects of the present disclosure.

FIG. 13 shows a graph 1300 of a typical distribution of CM measurement gaps coinciding with GSM frames having a frame number with each modulo 10, taken from a field log. As can be seen from the graph 1300, the distribution is approximately uniform (i.e., no frame with a given modulo coincides with a measurement gap more than three times as often as a frame with any other modulo).

According to aspects of the present disclosure, under idle condition, there is no point in a UE searching any GSM frame (e.g., for FCCH or SCH) more than once. From the graph 1300, it is clear that in the worst case, a UE operating according to previously known techniques will search 15 or more times on each frame.

In aspects of the present disclosure, a UE may be limited to searching frames having any modulo three times (e.g., to ensure time diversity for the searches) and sleep for the rest of a measurement gap during GSM frames having that modulo.

According to aspects of the present disclosure, there is an opportunity for significant power savings by sleeping during portions of CM gaps configured according measurement control message (MCM) information given to a UE by the network.

In previously known techniques, a compressed mode pattern for a UE is configured through physical channel configuration (PCR), and an identifier of a cell to measure in a CM measurement gap is sent to a UE in a measurement control message (MCM).

In aspects of the present disclosure, all of a CM pattern opened before a UE receives an MCM may be used for sleep, as the UE is not being scheduled for transmitting or receiving signals, but the UE also does not have information on the cells to be searched for.

According to previously known techniques, a UE in an LTE network that is configured to search for WCDMA networks may be configured with one or more L2W measurement gaps, perform a pseudo-random number (PN) search for WCDMA cells, and then perform one or more reconfirmation searches.

In aspects of the present disclosure, a UE configured to search for a WCDMA cell may, after measuring the cell, start a reconfirmation search timer (i.e., a reconfirmation expiry timer). The UE may sleep during all CM measurement gaps for that cell (e.g., L2W gaps) while the reconfirmation search timer is running. After expiration of the reconfirmation search timer, the UE may perform a reconfirmation search again on the same cell. As the length of reconfirmation search timers are on the order of seconds, there may be several CM measurement gaps that the UE can use sleep mode in.

According to aspects of the present disclosure, a multi-SIMM UE may experience conflicts over use of transmit-receive modules, due to radio frequency (RF) restrictions of the SIMMs and/or modules, which can result in a CM measurement gap being unusable. For example, a dual radio dual SIMM (DR-DS) phone may have two RF chains, wireless transmitter-receiver 1 (WTR1) and wireless transmitter-receiver 2 (WTR2). In the example, in compressed mode the UE needs to measure frequency X, which can only be measured on WTR2, for subscription 1 (SUB1) on the first SIMM. Still in the example, WTR2 is busy performing a high priority activity for another subscription (SUB2), such as a page decode. In the example, because WTR2 is busy, the CM gap goes to waste because of the inability to measure frequency X during the gap.

According to previously known techniques, significant discrepancies are seen between actual measurement gaps needed and measurement gaps configured by the network, as the network does not have a full picture of conditions at a UE. For example, when an LTE UE is searching for a GSM cell, after initial FCCH tone detection, the UE needs 625 Qs for SCH decode+400 Qs for startup+700 for clean up, totaling approximately 1725 Qs, which is just 1.5 ms, whereas a typical compressed mode measurement gap is around 2.666 ms to 9.4 ms. In a second example, when an LTE UE is searching for a WCDMA cell, after a first step is done, the UE just needs to do a list search, as configured by the network. In the second example, a typical worst case time to do the list search is around 3 ms, whereas a typical CM measurement gap is around 2.666 ms to 9.4 ms.

In aspects of the present disclosure, a UE may conserve power while measuring FACHs during FACH measurement gaps or FACH measurement occasions (FMOs). FACH measurement occasions are CM-like gaps defined in UMTS CELL FACH state. A typical duration of an FMO gap is 10 msec to 30 msec. A UE can be configured to measure the FACH during a portion of an FMO gap, and cause the receive chain to sleep during the remainder of the FMO gap.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

For example, means for determining, means for processing, means for indicating, and/or means for deciding may comprise a processing system, which may include one or more processors, such as the transmit processor 616 and/or the controller/processor 675 of the BS 610 illustrated in FIG. 6, and/or the transmit processor 668, and/or the controller/processor 659 of the user equipment 650 illustrated in FIG. 6. Means for transmitting and/or means for sending may comprise a transmit chain, which may include the transmit processor 616, the controller/processor 674, the transmitters 618, and/or the antenna(s) 620 of the BS 610 illustrated in FIG. 6, and/or the transmit processor 668, the transmitters 654, the controller/processor 658, and/or the antenna(s) 652 of the user equipment 650 illustrated in FIG. 6. Means for receiving may comprise a receive chain, which may include the receive processor 656, the receivers 654, the controller/processor 658, and/or the antenna(s) 652 of the UE 650 illustrated in FIG. 6, and/or the receive processor 670, the receivers 618, the controller/processor 675, and/or the antenna(s) 620 of the base station 610 illustrated in FIG. 6.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications performed by a user equipment (UE), comprising:
   obtaining a configuration indicating a measurement gap for the UE to measure one or more non-serving cells, wherein the UE does not receive data transmissions from a serving cell during the measurement gap;
   deciding not to measure the non-serving cells during a portion of the measurement gap; and
   deactivating a receive chain of the UE at a beginning of the portion of the measurement gap.

2. The method of claim 1, wherein the serving cell is a long term evolution (LTE) cell.

3. The method of claim 1, wherein the serving cell is a wideband code division multiple access (WCDMA) cell.

4. The method of claim 1, wherein the serving cell is a 5th generation (5G) cell.

5. The method of claim 1, wherein obtaining the configuration comprises:
   receiving a measurement control message (MCM) from the serving cell identifying one of the non-serving cells that the UE is to measure during the measurement gap.

6. The method of claim 1, wherein the deciding comprises:
   determining a first frame number of a first frame of a non-serving cell; and
   determining that the UE has previously not detected a signal from the non-serving cell a threshold number of second frames having second frame numbers having a same modulo 10 as the first frame number.

7. The method of claim 1, wherein the portion is all of the measurement gap.

8. The method of claim 1, wherein the deciding comprises determining that a reconfirmation search timer for one of the non-serving cells has not expired.

9. An apparatus for wireless communications, comprising:
- a processor configured to:
  - obtain a configuration indicating a measurement gap for the apparatus to measure one or more non-serving cells, wherein the apparatus does not receive data transmissions from a serving cell during the measurement gap;
  - decide not to measure the non-serving cells during a portion of the measurement gap; and
  - deactivate a receive chain of the apparatus at a beginning of the portion of the measurement gap; and
- a memory coupled with the processor.

10. The apparatus of claim 9, wherein the serving cell is a long term evolution (LTE) cell.

11. The apparatus of claim 9, wherein the serving cell is a wideband code division multiple access (WCDMA) cell.

12. The apparatus of claim 9, wherein the serving cell is a 5th generation (5G) cell.

13. The apparatus of claim 9, wherein the processor is configured to obtain the configuration by:
- receiving a measurement control message (MCM) from the serving cell identifying one of the non-serving cells that the apparatus is to measure during the measurement gap.

14. The apparatus of claim 9, wherein the processor is configured to decide not to measure the non-serving cells by:
- determining a first frame number of a first frame of a non-serving cell; and
- determining that the apparatus has previously not detected a signal from the non-serving cell a threshold number of second frames having second frame numbers having a same modulo 10 as the first frame number.

15. The apparatus of claim 9, wherein the portion is all of the measurement gap.

16. The apparatus of claim 9, wherein the processor is configured to decide not to measure the non-serving cells by determining that a reconfirmation search timer for one of the non-serving cells has not expired.

17. An apparatus for wireless communications, comprising:
- means for obtaining a configuration indicating a measurement gap for the apparatus to measure one or more non-serving cells, wherein the apparatus does not receive data transmissions from a serving cell during the measurement gap;
- means for deciding not to measure the non-serving cells during a portion of the measurement gap; and
- means for deactivating a receive chain of the apparatus at a beginning of the portion of the measurement gap.

18. The apparatus of claim 17, wherein the serving cell is a long term evolution (LTE) cell.

19. The apparatus of claim 17, wherein the serving cell is a wideband code division multiple access (WCDMA) cell.

20. The apparatus of claim 17, wherein the serving cell is a 5th generation (5G) cell.

21. The apparatus of claim 17, wherein the means for obtaining the configuration comprises:
- means for receiving a measurement control message (MCM) from the serving cell identifying one of the non-serving cells that the apparatus is to measure during the measurement gap.

22. The apparatus of claim 17, wherein the means for deciding comprises:
- means for determining a first frame number of a first frame of a non-serving cell; and
- means for determining that the apparatus has previously not detected a signal from the non-serving cell a threshold number of second frames having second frame numbers having a same modulo 10 as the first frame number.

23. The method of claim 1, wherein the portion is all of the measurement gap.

24. The apparatus of claim 17, wherein the means for deciding comprises means for determining that a reconfirmation search timer for one of the non-serving cells has not expired.

* * * * *